(12) United States Patent
Meister et al.

(10) Patent No.: US 9,139,114 B2
(45) Date of Patent: *Sep. 22, 2015

(54) LEG RESTRAINT DEVICE FOR SIDE-FACING SEATED VEHICLE OCCUPANTS

(71) Applicant: B/E Aerospace, Inc., Wellington, FL (US)

(72) Inventors: Pete C. Meister, Miami, FL (US); Michael J. Farvet, Wellington, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,996

(22) Filed: Oct. 21, 2014

(65) Prior Publication Data

US 2015/0035328 A1 Feb. 5, 2015

Related U.S. Application Data

(63) Continuation of application No. 14/060,143, filed on Oct. 22, 2013, now Pat. No. 8,894,095, which is a continuation-in-part of application No. 13/907,079, filed on May 31, 2013.

(51) Int. Cl.

| | |
|---|---|
| *B60N 2/427* | (2006.01) |
| *B64D 25/00* | (2006.01) |
| *B60R 21/231* | (2011.01) |
| *B64D 11/06* | (2006.01) |
| *B60R 21/02* | (2006.01) |
| *B60R 21/20* | (2011.01) |
| *B60R 21/00* | (2006.01) |
| *B60R 21/16* | (2006.01) |

(52) U.S. Cl.
CPC ............ *B60N 2/42727* (2013.01); *B60R 21/02* (2013.01); *B60R 21/20* (2013.01); *B60R 21/23138* (2013.01); *B64D 11/06* (2013.01); *B64D 11/0621* (2014.12); *B64D 11/06205* (2014.12); *B64D 25/00* (2013.01);

(Continued)

(58) Field of Classification Search
CPC ...... B60N 2/002; B60R 21/20; B60R 21/206; B60R 21/215; B64D 11/06; B64D 24/00; B64D 24/04
USPC ................ 280/730.1, 734, 735, 749.1, 728.1, 280/728.2, 730.3; 297/244, 245, 107; 244/121

See application file for complete search history.

(56) References Cited

U.S. PATENT DOCUMENTS

| | | |
|---|---|---|
| 2,859,803 A | 11/1958 | McCallister |
| 3,271,797 A | 9/1966 | Boyce |

(Continued)

FOREIGN PATENT DOCUMENTS

WO 2013001289 A1 1/2013

*Primary Examiner* — Paul N Dickson
*Assistant Examiner* — Darlene P Condra
(74) *Attorney, Agent, or Firm* — Shumaker, Loop & Kendrick, LLP

(57) ABSTRACT

A leg restraint for side-seated vehicle occupants, and including a leg-restraining member adapted for being mounted in proximity to a side-facing vehicle seat and selectively moveable between a deployed, outwardly-extending leg-protecting position and a retracted, non-leg interfering position, and an actuator positioned operatively proximate the leg-restraining member and responsive to a signal output by a sensor for deploying the leg-restraining member upon the occurrence of an abrupt deceleration of the vehicle sensed by the sensor. The actuator includes a cushion, and is adapted for being positioned for deployment between the leg-restraining member and the legs of the seat occupant. The cushion is positioned on the actuator to cushion the legs against direct impact against the deployed leg-restraining member.

16 Claims, 7 Drawing Sheets

(52) U.S. Cl.
CPC . *B60R2021/0053* (2013.01); *B60R 2021/0093* (2013.01); *B60R 2021/0273* (2013.01); *B60R 2021/161* (2013.01)

(56) References Cited

U.S. PATENT DOCUMENTS

| | | | |
|---|---|---|---|
| 3,287,064 A | 11/1966 | Freeman | |
| 3,329,464 A | 7/1967 | Barwood et al. | |
| 3,424,408 A | 1/1969 | Martin | |
| 4,183,582 A | 1/1980 | Taki | |
| 4,229,039 A | 10/1980 | Day | |
| 4,720,064 A | 1/1988 | Herndon | |
| 5,046,687 A | 9/1991 | Herndon | |
| 5,301,903 A | 4/1994 | Aronne | |
| 5,695,242 A | 12/1997 | Brantman et al. | |
| 6,217,059 B1 | 4/2001 | Brown et al. | |
| 7,118,180 B1 | 10/2006 | Tanaka et al. | |
| 8,020,939 B2 | 9/2011 | Stasiak et al. | |
| 2003/0184061 A1 | 10/2003 | Honda et al. | |
| 2004/0026905 A1 | 2/2004 | Kim et al. | |
| 2005/0127654 A1 | 6/2005 | Johansson et al. | |
| 2011/0012329 A1 | 1/2011 | Sekino et al. | |
| 2011/0043208 A1 | 2/2011 | Leussler | |
| 2011/0272929 A1 | 11/2011 | Fukawatase et al. | |

LEG RESTRAINT DEVICE FOR SIDE-FACING SEATED VEHICLE OCCUPANTS

CROSS-REFERENCE TO RELATED PATENT APPLICATIONS

This application is a continuation of and claims priority to co-pending U.S. patent application Ser. No. 14/060,143, filed Oct. 22, 2013, the full contents of which are incorporated into this application by reference, which is a continuation-in-part of and claims priority to co-pending U.S. patent application Ser. No. 13/907,079, filed May 31, 2013, the full contents of which are incorporated into this application by reference.

TECHNICAL FIELD AND BACKGROUND OF THE INVENTION

The present invention relates to a leg restraint device for side-seated vehicle occupants. In particular, the invention relates to a leg restraint device for side-seated occupant of, for example, corporate aircraft of the type offering side-facing seats for passengers. The disclosed invention has application in any form of vehicle transportation where passenger or occupant seats may be mounted in a side-facing orientation in relation to the direction of forward travel of the vehicle, such as an aircraft. The FAA has released Policy PS-ANM-25-03-R1 requiring leg flail prevention for occupants seated in side-facing seats when the occupant's upper leg is restricted by contact with the seat itself and/or with an interior component. In order to provide adequate occupant protection, the lower legs must also be restricted in a similar manner to avoid upper leg femur bone torsion. Thus, there is a need for a device that will provide this lower leg support during a dynamic event such as a crash.

Violent or abrupt deceleration can cause high g-force lateral loading on a side-facing passenger, causing lateral leg movement and leg rotation about the knee and femur. This can cause dislocations, muscle and tendon injuries and fractures due to the restraint exerted on the passengers' torso by seat belts and/or arm rests while the legs are unrestrained. However, belts or similar restraints on the legs are not advisable due to the additional time needed to remove the restraints, as well as the possibility that injuries to the passenger may make it difficult for either the passenger or emergency personnel to remove such restraints.

Therefore, there is a need for a type of leg restraint that provides protection to the legs of side-facing seat occupants in the event of a crash or other rapid deceleration, while not inhibiting rapid egress from the seat after the event.

The leg flail prevention device disclosed in this application deploys automatically and is designed to be triggered by the same sensor and trigger that is used to deploy inflatable shoulder harness air bags also installed on the side-facing seat. As such, for installations that restrict the side-facing occupant's upper legs in the forward direction, the automatic leg flail prevention device is utilized to introduce the higher level of occupant protection. In the embodiment disclosed in the application, a linear restraint panel presents the main restriction to the occupant's lower legs to prevent leg flail. This restraint panel is deployed by the inflation force of an attached air bag. Once the air bag deploys the restraint panel, the portion of the air bag attached to the restraint panel further inflates between the restraint panel and the leg to cushion the impact of the occupant's legs with the restraint panel.

SUMMARY OF THE INVENTION

It is therefore an object of the present invention to provide a leg restraint that provides protection to the legs of side-facing seat occupants in the event of a crash or other rapid deceleration.

It is another object of the invention to provide a leg restraint device that provides protection to the legs of side-facing seat occupants in the event of a crash or other rapid deceleration, while not inhibiting rapid egress from the seat after the event.

It is another object of the invention to provide a leg restraint device that provides protection to the lower legs of side-facing seat occupants in the event of a crash or other rapid deceleration, but that need not be deployed during taxi, take-off and landing ("TTOL").

It is another object of the invention to provide a leg restraint that includes an air bag as a means of deploying a linear restraint panel that acts to restrict lateral movement of the lower legs of a side-seated occupant.

It is another object of the invention to provide a leg restraint that includes a deployable air bag as a means of cushioning and restricting lateral movement of the lower legs of a side-facing seat occupant.

It is another object of the invention to provide a leg restraint that includes a deployable air bag utilized to deploy outwardly from the seat a linear restraint panel that acts to restrict lateral movement of the lower leg, whereupon the air bag continues deploying and serves the further purpose of cushioning and restricting lateral movement of the lower legs of a side-facing seat occupant.

These and other objects and advantages of the invention are achieved by providing a leg restraint for side-seated vehicle occupants, and including a leg-restraining member adapted for being mounted in proximity to a side-facing vehicle seat and selectively moveable between a deployed, outwardly-extending leg-protecting position and a retracted, non-leg interfering position, and an actuator positioned operatively proximate the leg-restraining member and responsive to a signal output by a sensor for deploying the leg-restraining member upon the occurrence of an abrupt deceleration of the vehicle sensed by the sensor. The actuator includes a cushion, and is adapted for being positioned for deployment between the leg-restraining member and the legs of the seat occupant. The cushion is positioned on the actuator to cushion the legs against direct impact against the deployed leg-restraining member.

According to another embodiment of the invention, a biasing member cooperates with the leg-restraining member to move the leg-restraining member into the retracted position after impact of an occupant's leg against the leg-restraining member.

According to another embodiment of the invention, a leg restraint for side-seated vehicle occupants is provided, and includes a leg-restraining member adapted for being mounted in proximity to a side-facing vehicle seat and selectively moveable between a deployed, outwardly-extending leg-protecting position and a retracted, non-leg interfering position. An actuator is positioned operatively proximate the leg-restraining member and responsive to a signal output by a sensor for deploying the leg-restraining member upon the occurrence of an abrupt deceleration of the vehicle sensed by the sensor. The actuator includes a cushion, and is adapted for being positioned for deployment between the leg-restraining member and the legs of the seat occupant, the cushion being positioned on the actuator to cushion the legs against direct impact against the deployed leg-restraining member. The actuator during a first phase deploys the leg-restraining member and during a second phase the actuator moves into a position between the leg-restraining member and the legs of the seat occupant wherein the cushion protects the legs against direct impact against the deployed leg-restraining member.

According to another embodiment of the invention, a leg restraint for side-seated vehicle occupants is provided, and includes a leg-restraining member adapted for being mounted in proximity to a side-facing vehicle seat and selectively moveable between a deployed, outwardly-extending leg-protecting position and a retracted, non-leg interfering position. An actuator is positioned operatively proximate the leg-restraining member and responsive to a signal output by a sensor for deploying the leg-restraining member upon the occurrence of an abrupt deceleration of the vehicle sensed by the sensor. The actuator includes a cushion, and is adapted for being positioned for deployment between the leg-restraining member and the legs of the seat occupant, the cushion being positioned on the actuator to cushion the legs against direct impact against the deployed leg-restraining member. The actuator during a first phase deploys the leg-restraining member, during a second phase deploys to a position between the leg-restraining member and the legs of the seat occupant and during a third phase deploys to a position beyond an outermost extent of the deployed leg-restraining member to cushion the legs against direct impact against the deployed leg-restraining member.

According to another embodiment of the invention, a leg restraint for side-seated vehicle occupants is provided that includes a leg-restraining member adapted for being mounted in proximity to a side-facing vehicle seat and selectively moveable between a deployed, outwardly-extending leg-protecting position and a retracted, non-leg interfering position. An actuator is positioned operatively proximate the leg-restraining member and responsive to a signal output by a sensor for deploying the leg-restraining member upon the occurrence of an abrupt deceleration of the vehicle sensed by the sensor. The actuator includes a cushion, and is adapted for being positioned for deployment between the leg-restraining member and the legs of the seat occupant, the cushion being positioned on the actuator to cushion the legs against direct impact against the deployed leg-restraining member. A retractor is provided for returning the leg-restraining member back into its retracted position upon the leg-restraining member reaching its fully deployed position, wherein the retractor comprises a spring having a bias that is initially overpowered by the operation of the actuator as the leg-restraining member is deployed, and is biased to return the leg-restraining member to its retracted position as the actuator retracts.

According to another embodiment of the invention, the cushion is shaped such that its widest extent is at its distal end.

According to another embodiment of the invention, the leg-restraining device includes a restraint panel having relatively upright side walls.

According to another embodiment of the invention, a sensor is provided for detecting abrupt movement of the vehicle in the direction of forward travel of the vehicle incident to an abrupt deceleration and outputting a responsive signal to a trigger responsive to the signal from the sensor for activating the air bag.

According to another embodiment of the invention, a leg restraint is provided, and is adapted for being mounted on a side-facing aircraft seat for protecting the legs of the seat occupant, and includes a restraint panel mounted in proximity to the side-facing aircraft seat and selectively moveable between a deployed, laterally-extending leg-protecting position and a retracted, non-leg interfering position. A sensor is provided for detecting abrupt movement of the vehicle in the direction of forward travel of the vehicle incident to an abrupt deceleration and outputting a responsive signal. An actuator is mounted on the restraint panel in a normally retracted configuration and in a position wherein, upon actuation, propels the restraint panel into the deployed position and then retracts. A trigger responsive to the signal output by the sensor is provided for deploying the actuator, and a biasing member includes a spring that is initially overpowered by the operation of the actuator as the restraint panel is deployed, and is biased to return the restraint panel to its retracted position as the actuator retracts.

According to another embodiment of the invention, the restraint panel is mounted in a housing adapted for being positioned under the seat bottom of the side-facing aircraft seat.

According to another embodiment of the invention, the restraint panel includes a slide mounted in the housing for movement on at least one stationary guide shuttle mounted on an inner surface of the housing.

According to another embodiment of the invention, the actuator includes a cushion, and is adapted for being positioned for deployment between the restraint panel and the legs of the seat occupant to cushion the legs against direct impact against the deployed leg-restraining member.

According to another embodiment of the invention, the actuator is adapted to deploy during a first phase to deploy the restraint panel and to further deploy during a second phase to a position between the restraint panel and the legs of the seat occupant to cushion the legs against direct impact against the deployed restraint panel.

According to another embodiment of the invention, the actuator is adapted to deploy during a first phase to deploy the restraint panel and to further deploy during a second phase to position the cushion between the restraint panel and the legs of the seat occupant and beyond the outermost extent of the deployed restraint panel to cushion the legs against direct impact against the deployed restraint panel.

According to another embodiment of the invention, a spring is provided for returning the leg-restraining member back into its retracted position upon the leg-restraining member reaching its fully deployed position.

According to another embodiment of the invention, the spring has a bias that is initially overpowered by the operation of the actuator as the leg-restraining member is deployed, and is biased to return the leg-restraining member to its retracted position as the actuator retracts.

According to another embodiment of the invention, the actuator has a shape that has its widest extent at its distal end and adapted to project outwardly beyond the distal end of the restraint panel at its fullest deployed extent.

According to another embodiment of the invention, the restraint panel includes a recess extending along a length of the restraint panel, and a guide shuttle mounted on the housing and having wheels engaging opposing top and bottom sides of the recess to guide the restraint panel between its retracted and deployed positions.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
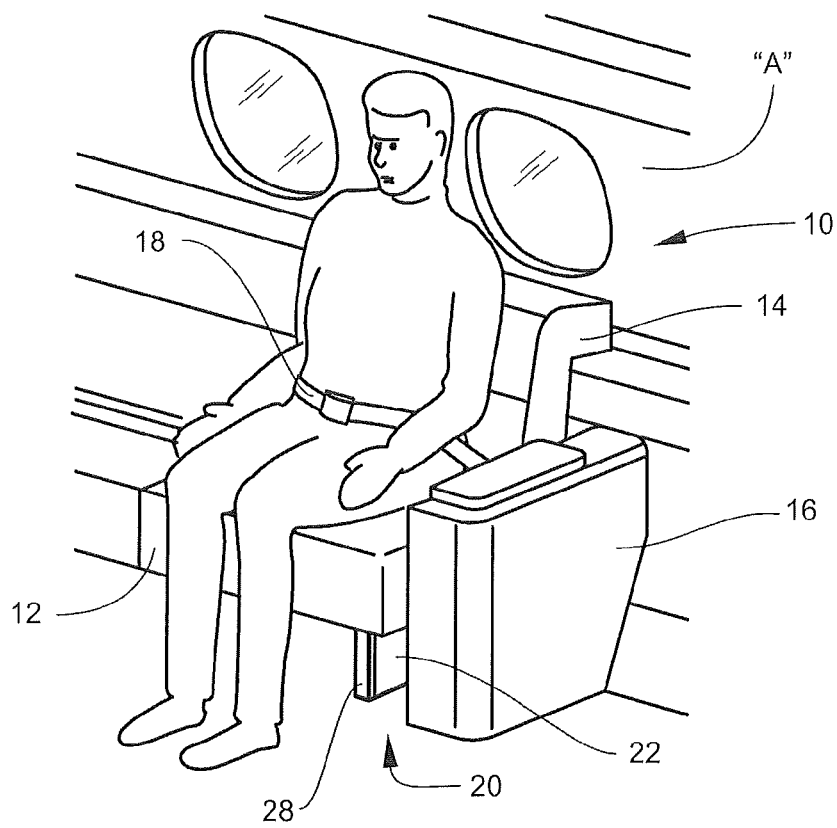
FIG. 1 is a perspective view of a side-seated aircraft seat, showing a leg restraint device according to a preferred embodiment of the invention in its retracted position.

Referring now specifically to the drawings, the environment of the disclosure is an aircraft of the type having side-facing seats, such as seat 10, having a seat bottom 12, seat back 14 and an armrest/end bay 16. Accordingly, a seat occupant sits with his or her back to the aircraft fuselage "A", facing outward in a generally perpendicular direction in relation to the longitudinal dimension of the aircraft and its direction of forward travel. For this reason, the occupant is subject to substantial lateral g-force loading along the longitudinal axis of the aircraft in the event of an abrupt deceleration such as might result during hard braking or a forward-directed crash event. While the upper torso and the thigh area of the legs are restrained to some extent by the armrest 16 and the seat belt 18, the lower legs are free to be projected laterally forward, rotating violently around an axis defined by the knees, causing potential serious injury to both the knees and lower legs unless they are restrained in some manner. Injury to the legs is a particularly serious concern since such injuries could prevent a passenger from being able to egress unaided from the aircraft in the event of an accident.

Figure 2:
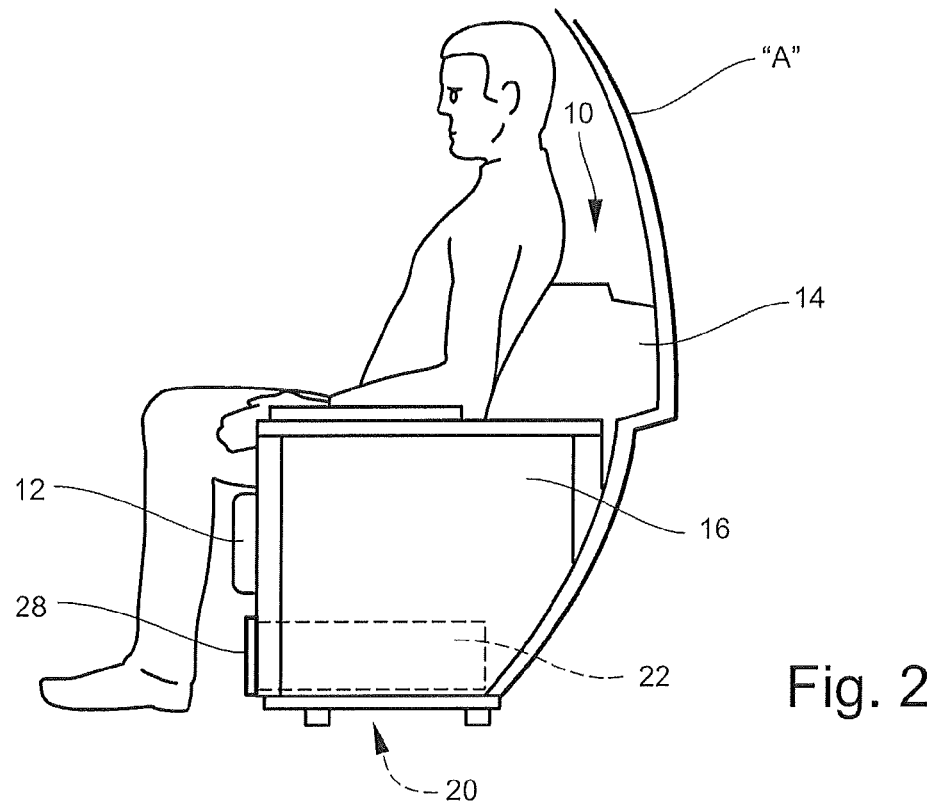
FIG. 2 is a side elevation of a side-seated aircraft seat, showing a leg restraint device according to a preferred embodiment of the invention in its retracted position.

Thus, in accordance with the invention, a leg restraint device 20 is provided. As shown in FIGS. 1 and 2, the leg restraint device 20 is mounted under the seat 10 forward of the occupant in relation to the aircraft's direction of forward travel. The leg restraint device 20 includes two principal elements a housing 22 mounted under the seat 10, and a deployable restraint panel 24, which includes a cap plate 28 on the distal end. During boarding, deplaning and normal flight, the leg restraint device 20 remains in a retracted condition, as shown in FIGS. 1 and 2. In the event of an emergency that may result in an abrupt deceleration, the restraint panel 24 is automatically deployed, as explained below.

The leg restraint device 20 as shown in the Figures is a "left-hand" oriented device shown mounted under a seat 10 and a left-hand side of the aircraft fuselage "A", from the position of the seat occupant. A right-hand device constructed in accordance with the invention would be utilized on seats facing inward from the right-hand side of the aircraft fuselage "A." In general, the left and right-hand versions both require mounting an air bag in a housing so that the air bag inflates against the leg of a seat occupant seated in a seat facing inward from the side of the aircraft fuselage, and are mirror constructions of each other.

Figure 3:
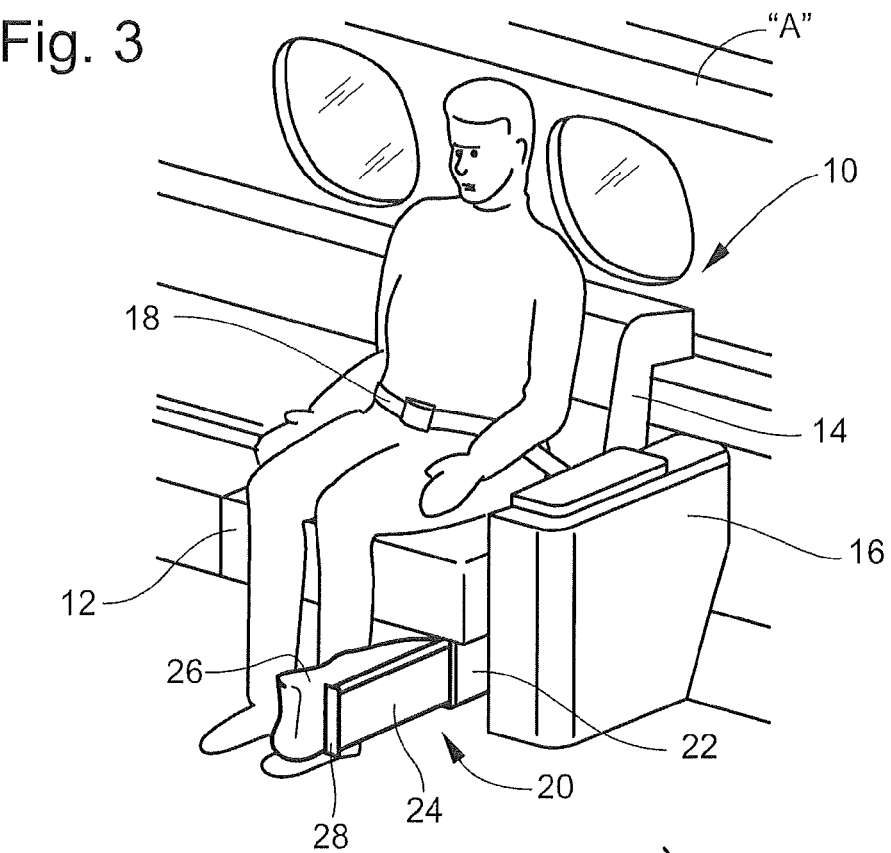
FIG. 3 is a perspective view of a side-seated aircraft seat, showing a leg restraint device according to a preferred embodiment of the invention in its deployed position.
Figure 4:
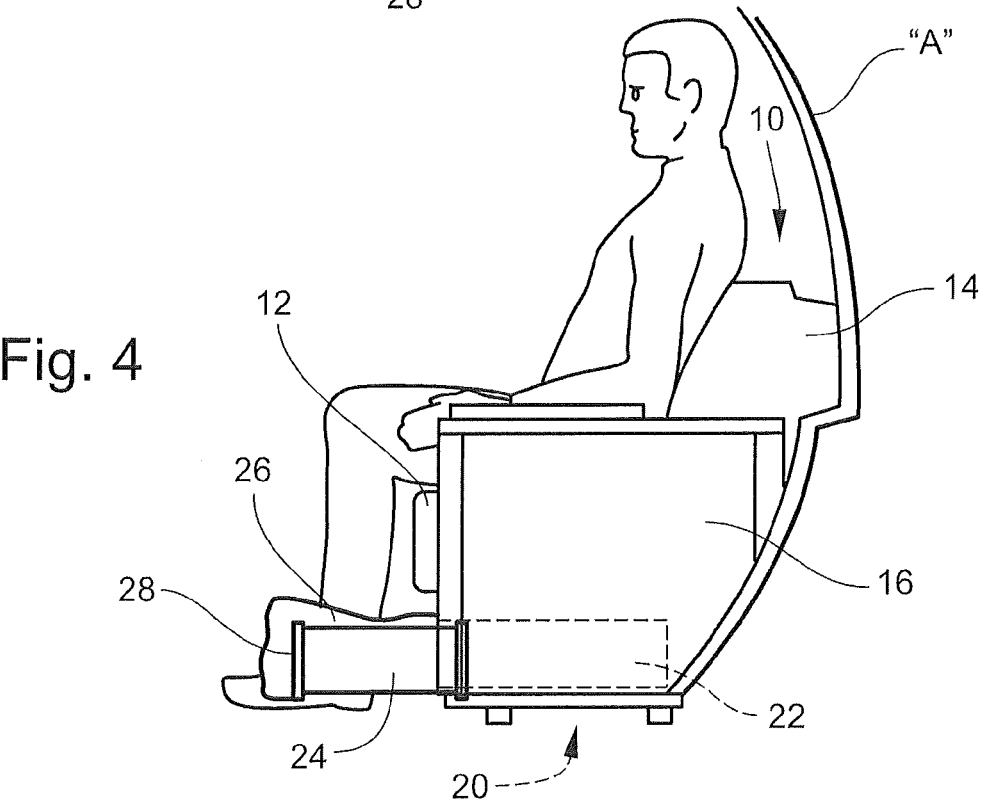
FIG. 4 is a side elevation of a side-seated seat, showing a leg restraint device according to a preferred embodiment of the invention in its deployed position.

As shown in FIGS. 3 and 4, the restraint panel 24, when deployed, projects forwardly of the seat 10 into a position where the legs of the seat occupant are positioned behind the restraint panel 24 in relation to the aircraft's direction of forward travel. In the event of an actual abrupt deceleration of the aircraft, the occupant's legs are prevented from continued unrestrained forward motion by the restraint panel 24. As described in further detail below, the restraint panel 24 is deployed by the inflation force imposed on the restraint panel 24 by an air bag 26 that is stored in the housing 22. Upon the occurrence of an event requiring side restraint protection of the seat occupant, the air bag 26 is triggered and during a first phase inflates and deploys the restraint panel 24 by forcing it rapidly out of the end of the housing 22.

During a second phase of the deployment of the air bag 26, it continues inflating and projects outwardly along the side of the deployed restraint panel 24 nearest the seat occupant's foot and lower leg. In this configuration, shown in FIGS. 3 and 4, the air bag 26 provides an air cushion between the seat occupant's feet and lower legs that prevents direct contact with the inner side of the restraint panel 24. Note that in its fully deployed configuration, the air bag 26 extends beyond the fully deployed position of the cap plate 28 of the restraint panel 24 in order to fully protect the seat occupant's feet and lower legs.

The restraint panel 24 is caused to retract back in to the housing 22 by the rapid deflation of the air bag 26, as is typical of air bag operation. This retraction occurs very rapidly and thus clears the area around the seat 10 for rapid, unrestricted egress by both the seat occupant and other aircraft occupants who may have to move past the seat 10 in order to egress from the aircraft.

Referring now to FIGS. 4-9, the housing 22 of the restraint device 20 is formed from two stationary housing covers 30, 32. The restraint panel 24 and the cap plate 28 slide in and out of the retracted and deployed positions on a wheeled guide shuttle 34 mounted on the inner surface of housing cover 32. Note that the restraint panel 24 has a "corrugated" cross-ssection, FIGS. 7 and 9, which provides the necessary spacing for the movable components. The guide shuttle 34 is captured in and rides along a central, longitudinally-extending recess 36 in the restraint panel 24.

Figure 5:
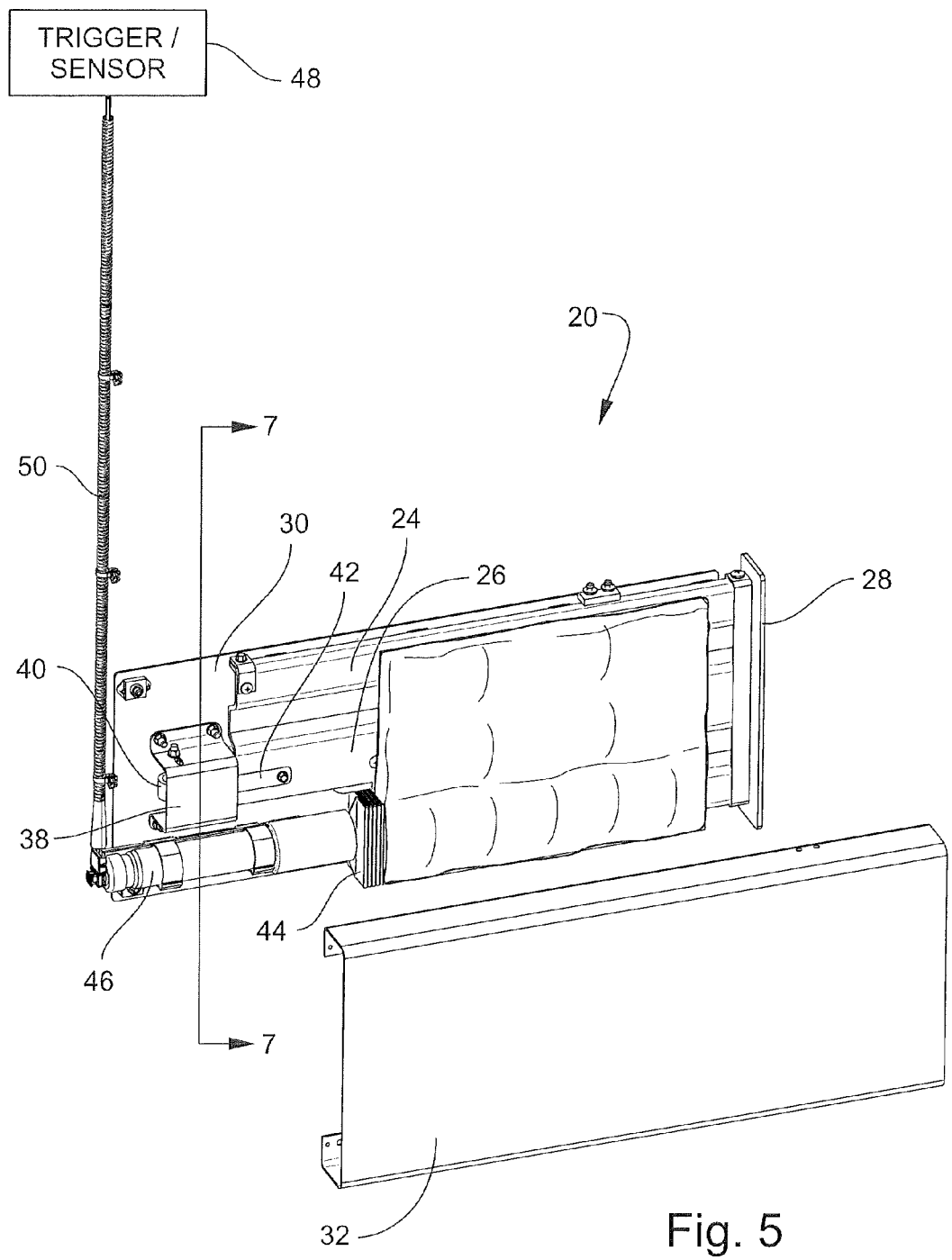
FIG. 5 is a partially-exploded view of one embodiment of the invention showing the air bag in its stowed, retracted position.
Figure 6:
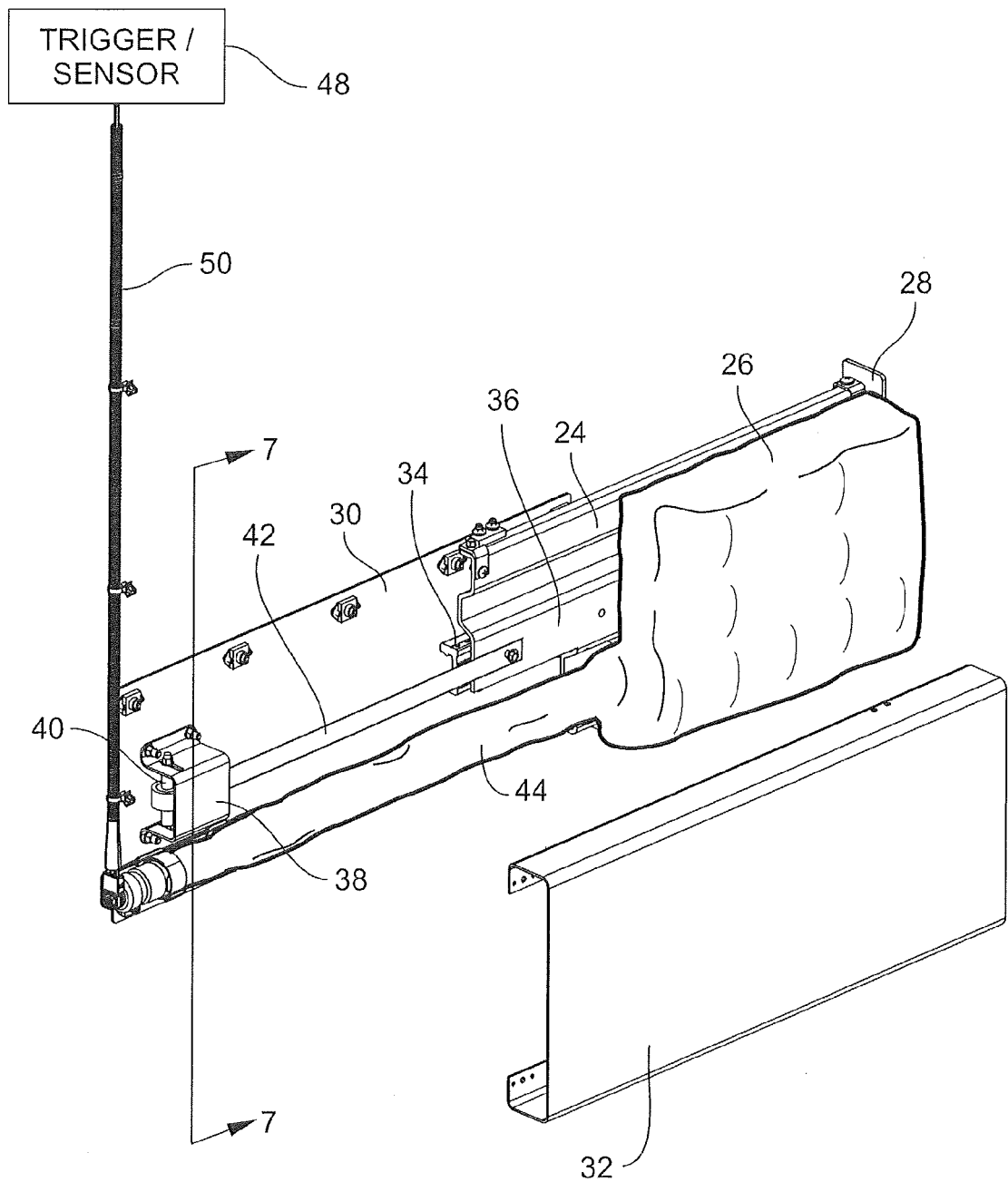
FIG. 6 is a partially-exploded view of one embodiment of the invention showing the air bag in its fully deployed position.
Figure 7:
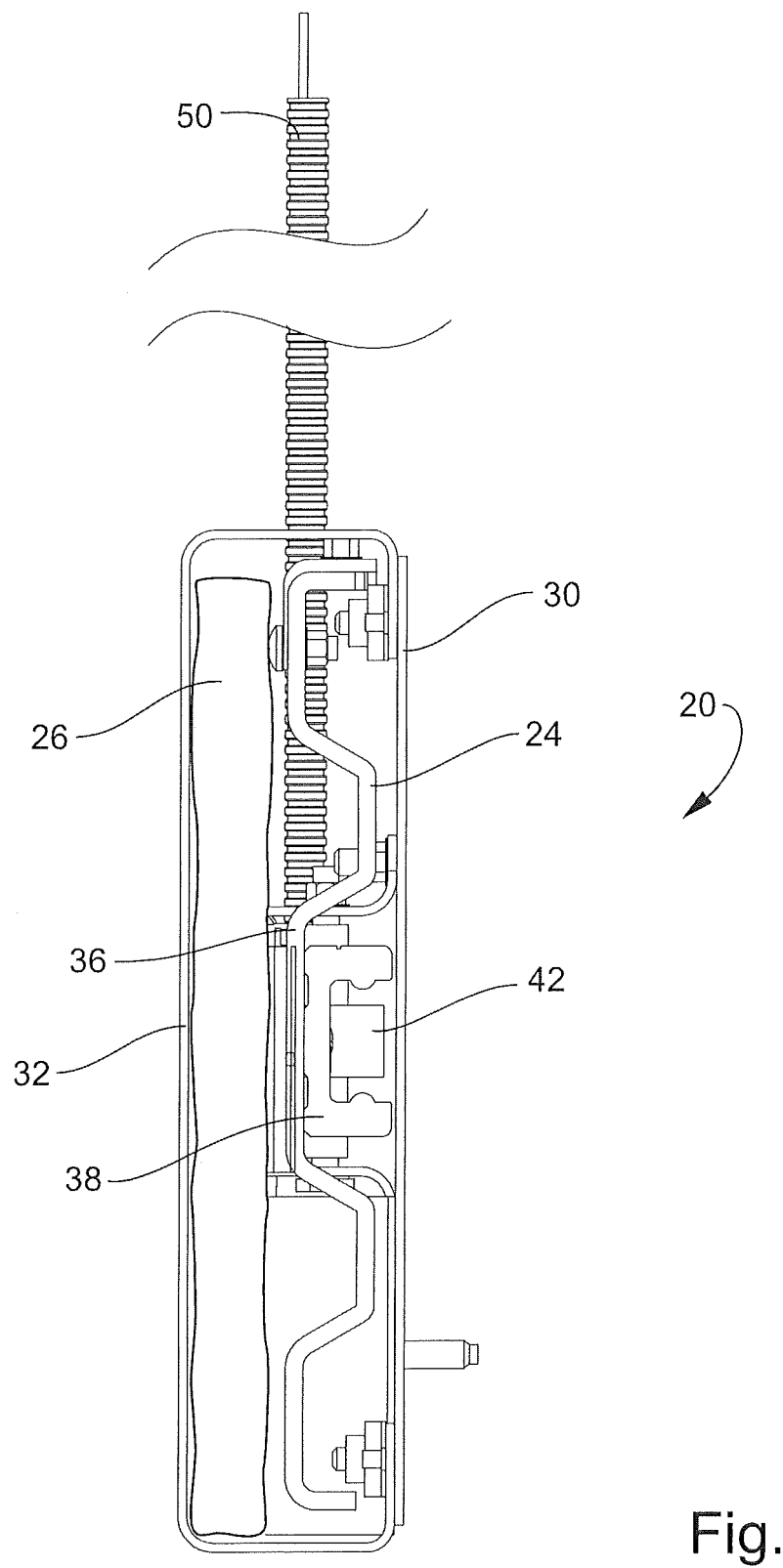
FIG. 7 is a vertical cross-section taken along line 7-7 of FIG. 5.
Figure 8:
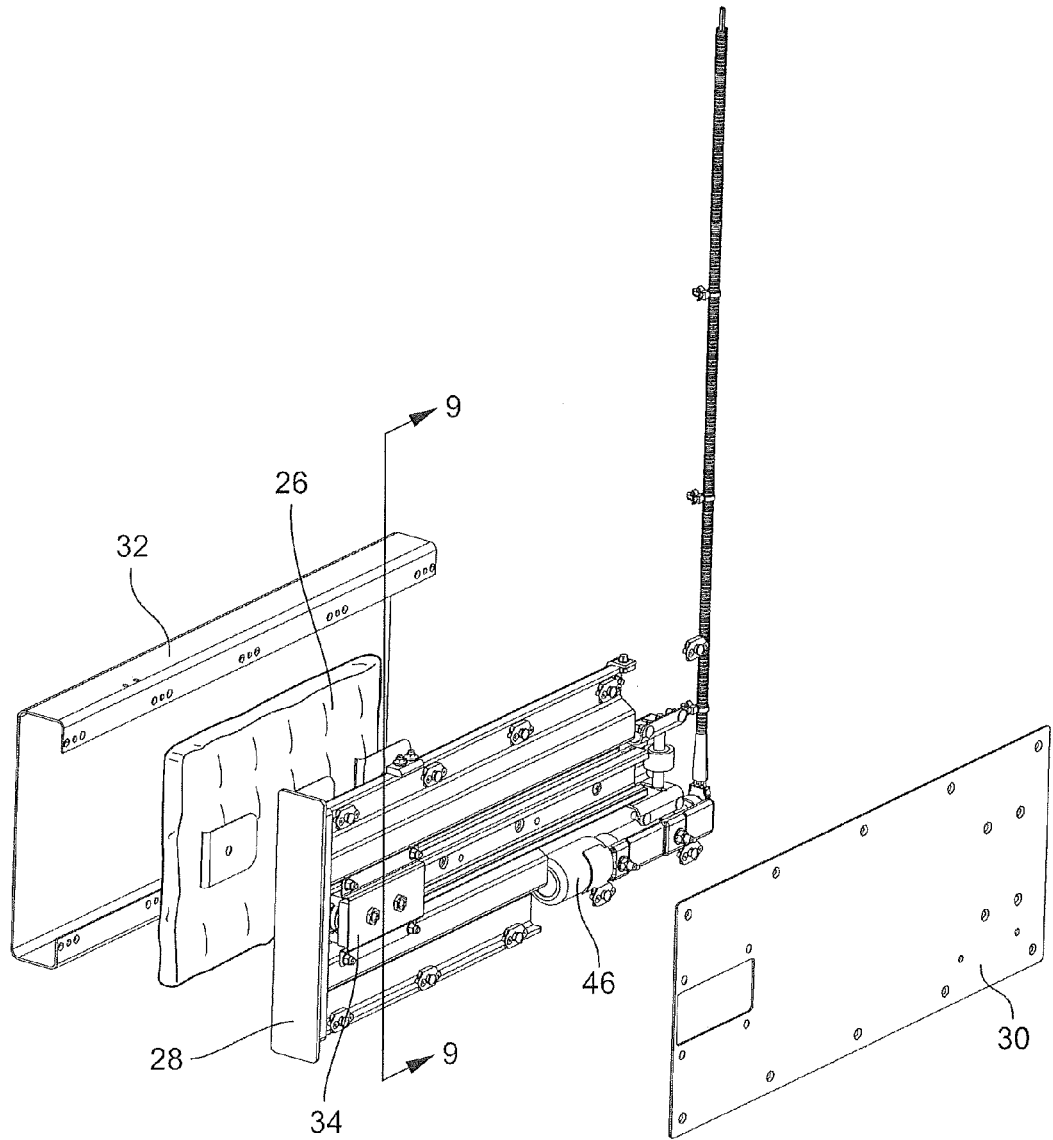
FIG. 8 is an exploded view of one embodiment of the invention from a side opposite FIGS. 5 and 6.
Figure 9:
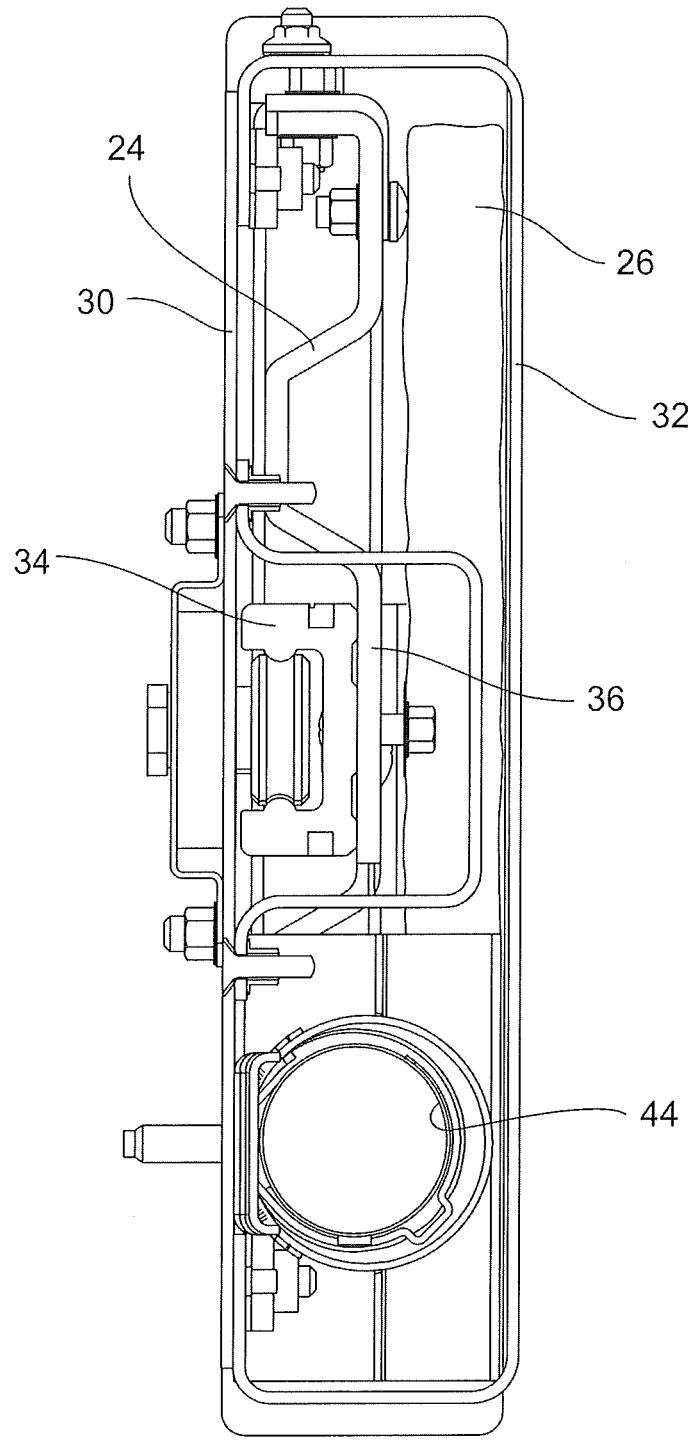
FIG. 9 is a vertical cross-section taken along line 9-9 of FIG. 8.

The restraint panel 24 is attached to a retractor that includes a spring housing 38 mounted on the cover 30. A vertical pin 40 mounts a coiled steel spring 42 that is mounted on the restraint panel 24 and biased towards its retracted position. See FIG. 5. Activation of the air bag 26 overcomes the bias of the spring 42 during inflation, allowing the restraint panel 24 to deploy, as shown in FIG. 6. As inflation ends and deflation begins, the spring 42 causes the restraint panel 24 to immediately retract so that, as described above, the restraint panel 24 does not project into the aircraft aisle impeding egress from the aircraft.

The air bag 26 is mounted on and extends along the length of the restraint panel 24. As is shown in FIG. 5, the air bag 26, before deployment, resides in a deflated configuration against the restraint panel 24. The air bag 26 includes a tubular neck 44 that is attached to an inflator 46 mounted on the cover 32. In the deflated configuration, the neck 44 is folded in an accordion manner between the inflator 46 and the air bag 26. The term "air bag" is generally used to describe this device even though gases other than "air" cause the bag to inflate. The inflator 46 may be a cold gas inflator, a hybrid inflator, or a pyrotechnic inflator depending on the design factors of the device. Speed, deployment time, gas temperature, etc. can all dictate the type of inflator 46 utilized to achieve the desired operation and may be the subject of varying legal and technical requirements.

The inflator 46 may be triggered by a trigger/sensor 48 that is also used to activate the seat belt 18, see FIG. 6, or by a trigger/sensor that functions only to inflate the air bag 26. As shown in FIGS. 5 and 6, the trigger/sensor 48 communicates with the inflator 46 through a shielded conduit 50. As shown in FIG. 6, inflation of the air bag 26 causes the neck 44 to first inflate as gas passes from the inflator 46 to the air bag 26. This inflation causes the neck 44 to unfold and straighten, driving the air bag 28 and the restraint panel 24 on which it is mounted rapidly forward out of the housing 22 and into the aisle of the aircraft, as shown in FIGS. 3 and 4. Typically, the air bag 26 is fully inflated within approximately 60-80 milliseconds, and vents in the air bag 26 allow the gas to escape, very rapidly deflating the air bag 26. The spring 42 rapidly returns the restraint panel 24 and air bag 26 to the position shown in FIG. 5, as described above.

A leg restraint device for side-seated vehicle occupants according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A leg restraint for side-seated vehicle occupants, and comprising:
   (a) a leg-restraining member adapted for being mounted in proximity to a side-facing vehicle seat and selectively moveable between a deployed, outwardly-extending leg-protecting position and a retracted, non-leg interfering position;
   (b) an actuator positioned operatively proximate the leg-restraining member and responsive to a signal output by a sensor for deploying the leg-restraining member upon the occurrence of an abrupt deceleration of the vehicle sensed by the sensor; and
   (c) wherein the actuator includes a cushion, and is adapted for being positioned for deployment between the leg-restraining member and the legs of the seat occupant, the cushion being positioned on the actuator to cushion the legs against direct impact against the deployed leg-restraining member.

2. A leg restraint according to claim 1, and including a biasing member cooperating with the leg-restraining member to move the leg-restraining member into the retracted position after impact of an occupant's leg against the leg-restraining member.

3. A leg restraint according to claim 1, wherein the leg-restraining device comprises a restraint panel having relatively upright side walls.

4. A leg restraint according to claim 1, and including a sensor for detecting abrupt movement of the vehicle in the direction of forward travel of the vehicle incident to an abrupt deceleration and outputting a responsive signal to a trigger responsive to the signal from the sensor for activating the air bag.

5. A leg restraint for side-seated vehicle occupants, and comprising:
   (a) a leg-restraining member adapted for being mounted in proximity to a side-facing vehicle seat and selectively moveable between a deployed, outwardly-extending leg-protecting position and a retracted, non-leg interfering position;
   (b) an actuator positioned operatively proximate the leg-restraining member and responsive to a signal output by a sensor for deploying the leg-restraining member upon the occurrence of an abrupt deceleration of the vehicle sensed by the sensor;
   (c) wherein the actuator includes a cushion, and is adapted for being positioned for deployment between the leg-restraining member and the legs of the seat occupant, the cushion being positioned on the actuator to cushion the legs against direct impact against the deployed leg-restraining member; and
   (d) further wherein the actuator during a first phase deploys the leg-restraining member and during a second phase the actuator moves into a position between the leg-restraining member and the legs of the seat occupant wherein the cushion protects the legs against direct impact against the deployed leg-restraining member.

6. A leg restraint for side-seated vehicle occupants, and comprising:
   (a) a leg-restraining member adapted for being mounted in proximity to a side-facing vehicle seat and selectively moveable between a deployed, outwardly-extending leg-protecting position and a retracted, non-leg interfering position;
   (b) an actuator positioned operatively proximate the leg-restraining member and responsive to a signal output by a sensor for deploying the leg-restraining member upon the occurrence of an abrupt deceleration of the vehicle sensed by the sensor;
   (c) wherein the actuator includes a cushion, and is adapted for being positioned for deployment between the leg-restraining member and the legs of the seat occupant, the cushion being positioned on the actuator to cushion the legs against direct impact against the deployed leg-restraining member; and
   (d) a retractor for returning the leg-restraining member back into its retracted position upon the leg-restraining member reaching its fully deployed position, wherein the retractor comprises a spring having a bias that is initially overpowered by the operation of the actuator as the leg-restraining member is deployed, and is biased to return the leg-restraining member to its retracted position as the actuator retracts.

7. A leg restraint according to claim 6, wherein the cushion is shaped such that its widest extent is at its distal end.

8. A leg restraint adapted for being mounted on a side-facing aircraft seat for protecting the legs of the seat occupant, and comprising:
   (a) a restraint panel mounted in proximity to the side-facing aircraft seat and selectively moveable between a deployed, laterally-extending leg-protecting position and a retracted, non-leg interfering position;
   (b) a sensor for detecting abrupt movement of the vehicle in the direction of forward travel of the vehicle incident to an abrupt deceleration and outputting a responsive signal;
   (c) an actuator mounted on the restraint panel in a normally retracted configuration and in a position wherein, upon actuation, propels the restraint panel into the deployed position and then retracts;
   (d) a trigger responsive to the signal output by the sensor for deploying the actuator; and
   (e) a biasing member comprising a spring that is initially overpowered by the operation of the actuator as the restraint panel is deployed, and is biased to return the restraint panel to its retracted position as the actuator retracts.

9. A leg restraint according to claim 8, wherein the restraint panel is mounted in a housing adapted for being positioned under the seat bottom of the side-facing aircraft seat.

10. A leg restraint according to claim 9, wherein the restraint panel comprises a slide mounted in the housing for movement on at least one stationary guide shuttle mounted on an inner surface of the housing.

11. A leg restraint according to claim 10, wherein the actuator includes a cushion, and is adapted for being positioned for deployment between the restraint panel and the legs of the seat occupant to cushion the legs against direct impact against the deployed leg-restraining member.

12. A leg restraint according to claim 11, wherein the actuator is adapted to deploy during a first phase to deploy the restraint panel and to further deploy during a second phase to a position between the restraint panel and the legs of the seat occupant to cushion the legs against direct impact against the deployed restraint panel.

13. A leg restraint according to claim 12, wherein the actuator is adapted to deploy during a first phase to deploy the restraint panel and to further deploy during a second phase to position the cushion between the restraint panel and the legs of the seat occupant and beyond the outermost extent of the deployed restraint panel to cushion the legs against direct impact against the deployed restraint panel.

14. A leg restraint according to claim 11, wherein the actuator has a shape that has its widest extent at its distal end and adapted to project outwardly beyond the distal end of the restraint panel at its fullest deployed extent.

15. A leg restraint according to claim 11, wherein the restraint panel includes a recess extending along a length of the restraint panel, and a guide shuttle mounted on the housing and having wheels engaging opposing top and bottom sides of the recess to guide the restraint panel between its retracted and deployed positions.

16. A leg restraint according to claim 8, and including a spring for returning the leg-restraining member back into its retracted position upon the leg-restraining member reaching its fully deployed position.

\* \* \* \* \*